United States Patent
Wessels

Patent Number: 6,118,225
Date of Patent: Sep. 12, 2000

[54] HIGH FREQUENCY DISCHARGE LAMP OPERATING CIRCUIT WITH RESONANT POWER FACTOR CORRECTION CIRCUIT

[75] Inventor: Johannes H. Wessels, Eindhoven, Netherlands

[73] Assignee: U.S. Philips Corporation, New York, N.Y.

[21] Appl. No.: 08/515,312

[22] Filed: Aug. 15, 1995

[30] Foreign Application Priority Data

Aug. 22, 1994 [EP] European Pat. Off. .............. 94202395

[51] Int. Cl.⁷ ..................................................... H05B 41/16
[52] U.S. Cl. ......................... 315/247; 315/205; 315/219; 315/DIG. 7; 315/209 R
[58] Field of Search .............................. 315/205, DIG. 7, 315/247, 209 R, 219, DIG. 5, 307, 224; 323/205, 207; 363/34, 37

[56] References Cited

U.S. PATENT DOCUMENTS

| | | | |
|---|---|---|---|
| 4,375,608 | 3/1983 | Kohler | 315/307 |
| 4,511,823 | 4/1985 | Eaton et al. | 315/226 |
| 4,782,268 | 11/1988 | Fahnrich et al. | 315/200 R |
| 4,808,887 | 2/1989 | Fahnrich et al. | 315/247 |
| 5,303,140 | 4/1994 | Shimizu | 363/132 |
| 5,412,287 | 5/1995 | Shackle | 315/247 |

Primary Examiner—Arnold Kinkead
Attorney, Agent, or Firm—Bernard Franzblau

[57] ABSTRACT

A circuit arrangement comprising a DC-AC converter for operating a lamp (La). A first capacitor is connected across first and second inputs of the DC-AC converter. A first coil and a second capacitor are connected in a series circuit to first and second outputs of a rectifier circuit coupled to an AC supply voltage. Two diodes are serially connected between the first output and the first input. A third capacitor is connected between a junction point of the two diodes and a junction point between two series connected transistors of the DC-AC converter. The diodes, the coil (L1) and the second and third capacitors (C2, C3) are so dimensioned that the resonance frequency of a series circuit of the coil and the second and third capacitors connected in parallel is approximately equal to the operating frequency of the DC-Ac converter. As a result, the circuit arrangement has a high power factor.

18 Claims, 1 Drawing Sheet

HIGH FREQUENCY DISCHARGE LAMP OPERATING CIRCUIT WITH RESONANT POWER FACTOR CORRECTION CIRCUIT

BACKGROUND OF THE INVENTION

This invention relates to a circuit arrangement for operating a lamp, provided with terminals for connection to a supply voltage source, rectifying means provided with a first output and a second output and coupled to the terminals, for rectifying an AC voltage supplied by the supply voltage source, a DC-AC converter provided with a first input and a second input, coupled to the respective outputs, a first branch comprising first capacitive means and interconnecting the inputs, a second branch comprising a series circuit of first inductive means and second capacitive means and connecting the first output to the second output, a third branch comprising a series circuit of two unidirectional elements and connecting a common junction point of the first inductive means and the second capacitive means to the first input, and a fourth branch, comprising third capacitive means and connecting a common junction point of the unidirectional elements to a point of the DC-AC converter at which a high-frequency voltage is present during lamp operation.

Such a circuit arrangement is known from European Patent Application 0 244 644, which corresponds to U.S. Pat. No. 4,782,268 (Nov. 1, 1988). In the known circuit arrangement, the first branch acts as a filter whose function is, inter alia, to improve the power factor of the circuit arrangement. To fulfill this function satisfactorily, the self-inductance of the first inductive means is chosen to be comparatively great, so that the first inductive means form a voluminous and expensive component of the circuit arrangement.

SUMMARY OF THE INVENTION

The invention has for an object to provide a circuit arrangement whose power factor is comparatively high and whose first inductive means in the first branch have a comparatively low self-inductance.

According to the invention, a circuit arrangement as described in the opening paragraph is for this purpose characterized in that the resonance frequency of a series circuit formed by the first inductive means and by a parallel arrangement of the second capacitive means and the third capacitive means is chosen to lie within a range limited by 0.1 Fb and 2.0 Fb, where Fb is the operating frequency of the DC-AC converter.

It was found that a circuit arrangement according to the invention has a comparatively high power factor. Since the operating frequency of the DC-AC converter usually is of the order of 10 kHz or even higher, it is possible to choose the self-inductance of the first inductive means and the capacitance values of the second and third capacitive means to be comparatively low, so that the circuit arrangement does not comprise any voluminous or comparatively expensive components.

It was also found that particularly high power factor values can be realised in that the resonance frequency of a series circuit formed by the first inductive means and by a parallel arrangement of the second capacitive means and the third capacitive means is chosen to lie within a range limited by 0.5 Fb and 1.5 Fb.

It was found to be advantageous to construct the DC-AC converter such that it comprises a series circuit of two switching elements coupled to the inputs, and that the fourth branch connects a common junction point of the unidirectional elements to a common junction point of the switching elements. A very high power factor is realised because a high-frequency voltage of comparatively great amplitude is applied to the common junction point of the two switching elements during lamp operation.

It was also found to be advantageous when the ratio between the capacitance of the second capacitive means and the capacitance of the third capacitive means is chosen to lie within a range limited by 1 and 4.

The measure according to the invention yielded particularly good results in circuit arrangements wherein the operating frequency of the DC-AC converter is of the order of 1 MHz. Such circuit arrangements are used, for example, for operating electrodeless lamps. Owing to the very high operating frequency, a substantial portion of the second and third capacitive means is formed by parasitic capacitances of components and conductive connections in the circuit arrangement.

To enhance the effect achieved by the measure according to the invention, it is possible to implement the measure according to the invention twice in the circuit arrangement. Such a circuit arrangement comprises, besides the first inductive means, second inductive means, the second branch comprises a series circuit of the first inductive means, the second capacitive means, and the second inductive means, and the circuit arrangement is further provided with a fifth branch which comprises a series circuit of two further unidirectional elements and which connects the second input to a common junction point of the second capacitive means and the second inductive means, and a sixth branch which comprises fourth capacitive means and which connects a common junction point of the further unidirectional elements to a point of the DC-AC converter at which a high-frequency voltage is present during lamp operation.

Very favourable results were achieved with a circuit arrangement in which the DC-AC converter comprises a series arrangement of two switching elements coupled to the inputs, and the sixth branch connects a common junction point of the further unidirectional elements to a common junction point of the switching elements.

BRIEF DESCRIPTION OF THE DRAWINGS

Embodiments of the invention will be explained in more detail with reference to the accompanying drawing, in which:

In FIG. 1, K1 and K2 form terminals for connection to a supply voltage source. RB are rectifying means coupled to the terminals for rectifying an AC-voltage supplied by the supply voltage source. K3 and K4 are a first and a second output, respectively. K3 and K4 are coupled to a first input K5 and a second input K6, respectively, of a DC-AC converter formed by inputs K5 and K6, switching elements Q1 and Q2, capacitors C4 and C5, and coil Ba. In addition, the DC-AC converter of FIG. 1 comprises means (not shown) for rendering switching elements Q1 and Q2 alternately conducting and non-conducting. A discharge lamp La is connected to the DC-AC converter. The construction of the DC-AC converter is as follows. The first input K5 and the second input K6 are interconnected by a series arrangement of the switching elements Q1 and Q2. The inputs are also interconnected by a series arrangement of capacitor C4 and capacitor C5. A common junction point of the switching elements Q1 and Q2 is connected to a common junction point of the capacitors C4 and C5 by way of a series circuit of coil Ba and lamp La. A first branch comprising first capacitive means is formed by capacitor C1, while also interconnecting the inputs. A second branch formed by coil L1 and capacitor C2 interconnects the outputs K3 and K4. Coil L1 and capacitor C2 in this embodiment form first inductive means and second capacitive means, respectively. A third branch comprising a series arrangement of two unidirectional elements connects a common junction point of coil L1 and capacitor C2 to input K5. The two unidirectional elements in this embodiment are formed by diode D1 and diode D2. Capacitor C3 forms a third capacitive means and at the same time a fourth branch which connects a common junction point of the two diodes D1 and D2 to a common junction point of the two switching elements Q1 and Q2. Output K4 is connected to input K6. The dimensioning of the circuit arrangement is such that the resonance frequency of a series circuit formed by coil L1 and a parallel arrangement of capacitor C2 and capacitor C3 is approximately equal to the operating frequency of the DC-AC converter.

Figure 1:
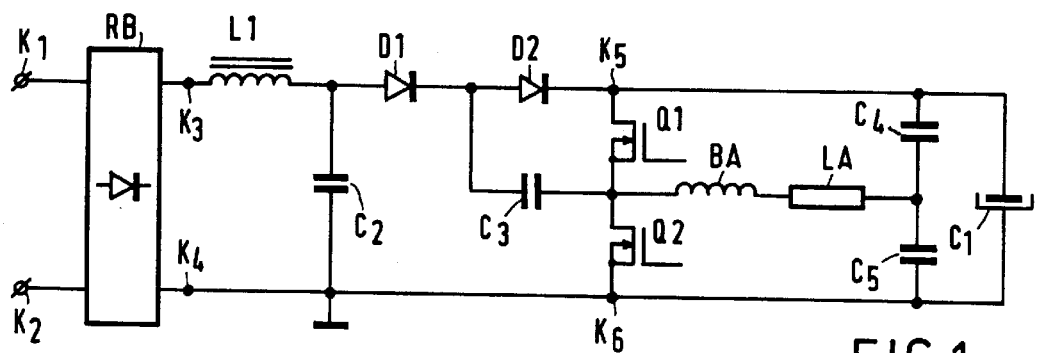
FIG. 1 shows an embodiment of a circuit arrangement according to the invention.

The operation of the circuit arrangement shown in FIG. 1 is as follows.

When the terminals K1 and K2 are connected to a supply voltage source, the rectifying means RB rectify the AC voltage supplied by the supply voltage source into a DC voltage which is present between the outputs K3 and K4. At the same time, the switching elements Q1 and Q2 are rendered conducting and non-conducting alternately at a frequency f. Since a DC-voltage is is present across capacitor C1 during stationary lamp operation, a resulting high-frequency alternating current of frequency f flows through the lamp La. The capacitor C3 is charged from the supply voltage source through diode D1 and subsequently discharged through diode D2 and capacitor C1, also at the frequency f. As a result, a DC-voltage is present across capacitor C1 during stationary lamp operation with an amplitude higher than the maximum amplitude of the AC voltage supplied by the supply voltage source. It is prevented thereby that a peak current is taken up from the supply voltage source when the amplitude of the AC voltage reaches its maximum value. Since the frequency f is approximately equal to the resonance frequency of the series circuit formed by coil L1 and a parallel arrangement of capacitor C2 and capacitor C3, the amplitude of the high-frequency voltage across C3 is comparatively great. As a result, the charging current which charges capacitor C1 from capacitor C3 during a portion of each high-frequency cycle is comparatively high. When the instantaneous amplitude of the AC voltage exceeds a certain threshold value, the maximum amplitude of the high-frequency voltage across capacitor C3 reaches a value which is equal to the amplitude of the DC voltage present across capacitor C1. The amplitude of the high-frequency voltage across capacitor C3 does not increase any further with a further increase in the instantaneous amplitude of the AC voltage. This means that also the charging current of capacitor C1 from capacitor C3 does not increase any further. The limitation of the maximum amplitude of the high-frequency voltage across capacitor C3 also limits the maximum amplitude of the high-frequency voltage across capacitor C2. As a result, the current through the coil L1 charges the capacitor C1 directly during a portion of each high-frequency cycle. This direct charging current compensates for the fact that the charging current from capacitor C3 does not rise any further when the instantaneous amplitude of the AC-voltage exceeds the threshold value. It is achieved thereby that the total charging current (formed by the charging current through capacitor C3 and the direct charging current through coil L1) taken up from the supply voltage source is approximately proportional to the instantaneous amplitude of the AC voltage, i.e. the power factor of the circuit arrangement is comparatively high.

Figure 2:
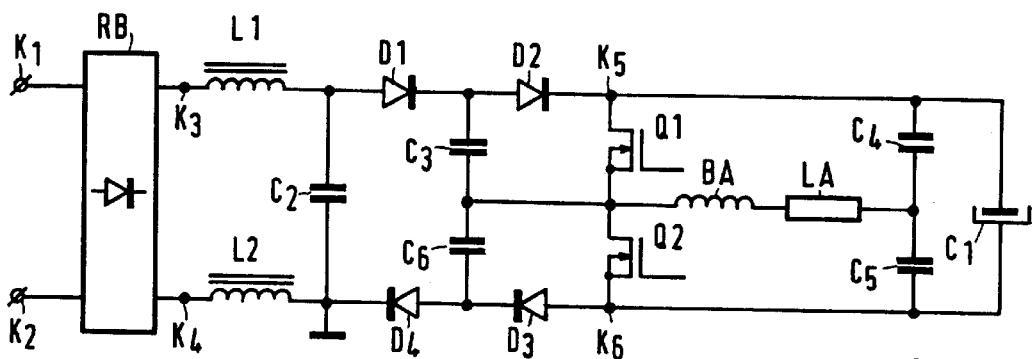
FIG. 2 shows a further embodiment of a circuit arrangement according to the invention.

In the circuit arrangement shown in FIG. 2, all components corresponding to components of the circuit arrangement shown in FIG. 1 have been given the same reference symbols. The circuit arrangement shown in FIG. 2 comprises, besides first inductive means formed by coil L1, second inductive means formed by coil L2. The second branch in this embodiment is formed by the series circuit of coil L1, capacitor C2, and coil L2. The diodes D3 and D4 form further unidirectional elements. The series arrangement of diode D3 and diode D4 forms a fifth branch, connecting the second input K6 to a common junction point of capacitor C2 and coil L2. Capacitor C6 in this embodiment forms fourth capacitive means and at the same time a sixth branch which connects a common junction point of diode D3 and diode D4 to a common junction point of switching elements Q1 and Q2. The dimensioning is so chosen that the resonance frequency of a series circuit of coil L2 and a parallel arrangement of capacitor C6 and capacitor C2 is approximately equal to the operating frequency of the DC-AC converter. The dimensioning is also so chosen that the resonance frequency of a series circuit of coil L1 and a parallel arrangement of capacitor C2 and capacitor C3 is approximately equal to the operating frequency of the DC-AC converter.

The operation of the circuit arrangement shown in FIG. 2 is as follows.

As in the circuit arrangement shown in FIG. 1, capacitor C3 is alternately charged from the supply voltage through diode D1 and discharged through diode D2 and capacitor C1 during each high-frequency cycle. In the circuit arrangement shown in FIG. 2, in addition, capacitor C6 is also charged from the supply voltage through diode D4 and discharged through diode D3 and capacitor C1 in each high-frequency cycle. The result of this is that capacitor C1 is charged consecutively from capacitor C3 and from capacitor C6 during each high-frequency cycle. The amplitude of the DC-voltage across capacitor C1 is thus comparatively high, which favourably affects the power factor of the circuit arrangement. When the instantaneous amplitude of the AC-voltage exceeds a threshold value, where the maximum amplitude of the high-frequency voltage across capacitor C6 is equal to the amplitude of the DC voltage across capacitor C1, the capacitor C1 is directly charged by the current through coil L2 during a portion of each high-frequency cycle. When the instantaneous amplitude of the AC voltage has also exceeded a further threshold value, where the maximum amplitude of the high-frequency voltage across capacitor C3 is equal to the amplitude of the DC-voltage across capacitor C1, the capacitor C1 is similarly directly charged by the current through coil L1 during a portion of each high-frequency cycle. Given such values of the instantaneous amplitude of the AC voltage, both the direct charging current of coil L1 and the direct charging current of coil L2 compensate for the fact that the charging currents from capacitor C3 and capacitor C6 do not rise any further.

Figure 3:
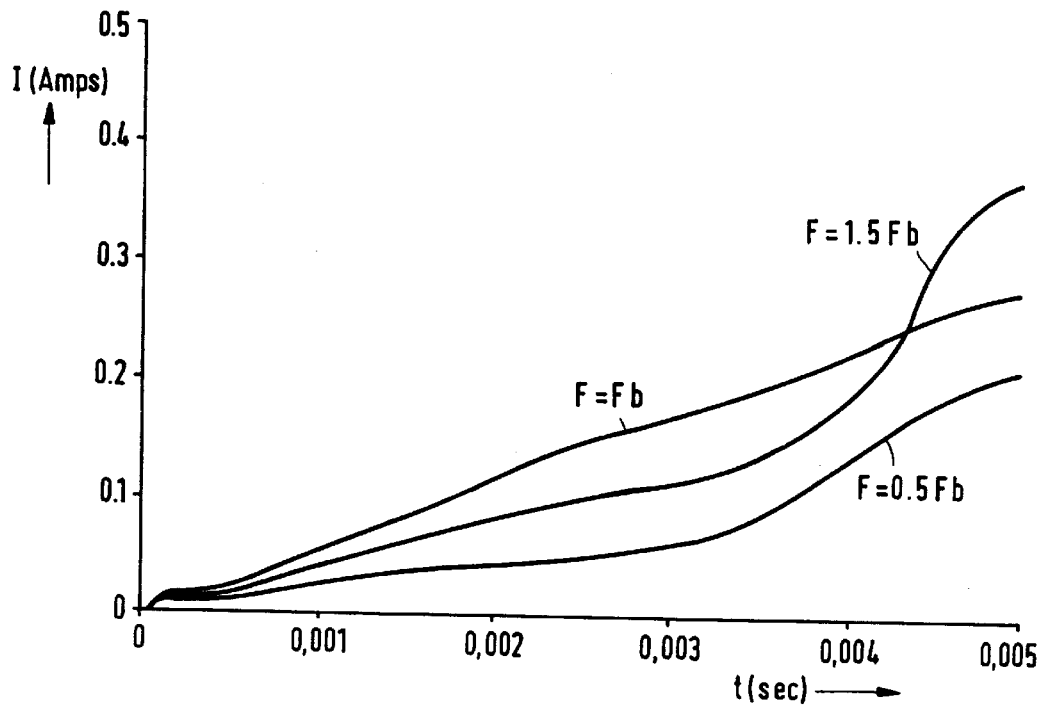
FIG. 3 shows the currents taken up from the supply voltage source for various dimensionings of the embodiment shown in FIG. 1.

FIG. 3 shows the currents derived from the supply voltage source for various dimensionings of the embodiment shown in FIG. 1 for the case in which the supply voltage is a sinusoidal AC voltage with a frequency of 50 Hz and an effective value of 220 V. The current is plotted in amps on the vertical axis. Time is plotted in seconds on the horizontal axis. The current waveform is shown over a time interval of 0.005 second, i.e. a quarter of a supply voltage cycle. The capacitance of capacitor C2 was 11 nF, as was the capacitance of capacitor C3. The operating frequency Fb of the DC-AC converter is 30 kHz. The self-inductances of coil L1 were so chosen consecutively that the resonance frequencies of the parallel circuit of capacitor C2 and capacitor C3 are the coil L1 were approximately 0.5 Fb, Fb and 1. 5 Fb, respectively. It is evident from FIG. 3 that, at a resonance frequency approximately equal to Fb, a current drawn from the supply voltage source exhibits the smallest deviation from a sine shape. The power factors in these three cases were 0.93; 0.99; and 0.93, respectively. It is also visible in FIG. 3 that the current drawn from the supply voltage source is lower when the resonance frequency of L1, C2 and C3 is approximately equal to 0.5 Fb or 1.5 Fb than when the resonance frequency is approximately equal to Fb, so that in the former two cases less power is drawn from the supply voltage source than in the case with the resonance frequency equal to Fb. A further modification in the dimensioning of the, circuit arrangement is necessary, which leads to an increase in the consumed power as well as to a decrease in the power factor, if the power drawn from the supply voltage source with the resonance frequency equal to 0.5 Fb or 1.5 Fb is to be rendered equal to the power drawn with the resonance frequency approximately equal to Pb.

In a concrete realisation of a circuit arrangement according to the invention as shown in FIG. 1, the self-inductance of coil L1 was 31 $\mu$H, the capacitance of capacitor C2 was 58 pF, and the capacitance of capacitor C3 was 71 pF. The operating frequency of the DC-AC converter was 2.65 MHz. In view of the high operating frequency, the capacitance of both capacitor C2 and of capacitor C3 is supplemented with parasitic capacitances. The circuit arrangement was supplied with a sinusoidal AC voltage with a frequency of approximately 50 Hz and an effective value of 220 V. The power factor was 0.96. The power factor was no more than 0.53 when capacitor C3 was removed from the circuit arrangement.

What is claimed is:

1. A circuit arrangement for operating a lamp, comprising:
   terminals for connection to an AC supply voltage source,
   rectifying means provided with a first output and a second output and coupled to the terminals for rectifying the AC voltage,
   a DC-AC converter provided with a first input and a second input coupled to the first output and the second output, respectively,
   a first branch comprising first capacitive means interconnecting the first and second inputs,
   a second branch comprising a series circuit of first inductive means and second capacitive means and connecting the first output to the second output,
   a third branch comprising a series circuit of two unidirectional elements which connect a common junction point of the first inductive means and the second capacitive means to the first input, and
   a fourth branch comprising third capacitive means for connecting a common junction point of the two unidirectional elements to a point of the DC-AC converter at which a high-frequency voltage is present during lamp operation,
   wherein the resonance frequency of a series circuit formed by the first inductive means and by a parallel arrangement of the second capacitive means and the third capacitive means is chosen to lie within a range limited by 0.1 Fb and 2.0 Fb, where Fb is the operating frequency of the DC-AC converter.

2. A circuit arrangement as claimed in claim 1, wherein the resonance frequency of the series circuit formed by the first inductive means and the parallel arrangement of the second capacitive means and the third capacitive means is chosen to lie within a range limited 0.5 Fb and 1.5 Fb.

3. A circuit arrangement as claimed in claim 1, wherein the DC-AC converter comprises a series circuit of two switching elements coupled to the first and second inputs of the DC-AC converter, and the fourth branch connects the common junction point of the two unidirectional elements to a common junction point of the two switching elements.

4. A circuit arrangement as claimed in claim 1, wherein the ratio between the capacitance of the second capacitive means and the capacitance of the third capacitive means is chosen to lie within a range between 1 and 4.

5. A circuit arrangement as claimed in claim 1, wherein the operating frequency of the DC-AC converter is higher than 1 MHz.

6. A circuit arrangement as claimed in claim 1, which further comprises: second inductive means, wherein the second branch comprises a series circuit of the first inductive means, the second capacitive means, and the second inductive means, and the circuit arrangement further comprises;
   a fifth branch which comprises a series circuit of two further unidirectional elements which connects the second input to a common junction point of the second capacitive means and the second inductive means, and
   a sixth branch which comprises fourth capacitive means which connects a common junction point of the two further unidirectional elements to a point of the DC-AC converter at which a high frequency voltage is present during lamp operation.

7. A circuit arrangement as claimed in claim 6, wherein the DC-AC converter comprises a series arrangement of two switching elements coupled to the first and second inputs, and the sixth branch connects the common junction point of the two further unidirectional elements to a common junction point of the two switching elements.

8. A circuit arrangement as claimed in claim 2, wherein the DC-AC converter comprises a series circuit of two switching elements coupled to the first and second inputs of the DC-AC converter, and the fourth branch connects the common junction point of the two unidirectional elements to a common junction point of the two switching elements.

9. A, circuit arrangement as claimed in claim 2, wherein the ratio between the capacitance of the second capacitive means and the capacitance of the third capacitive means is chosen to lie within a range between 1 and 4.

10. A circuit arrangement as claimed in claim 4, which further comprises: second inductive means, wherein the second branch comprises a series circuit of the first inductive means, the second capacitive means, and the second inductive means, and the circuit arrangement further comprises;
    a fifth branch which comprises a series circuit of two further unidirectional elements which connects the second input to a common junction point of the second capacitive means and the second inductive means, and a sixth branch which comprises fourth capacitive means which connects a common junction point of the two further unidirectional elements to a point of the DC-AC converter at which a high frequency voltage is present during lamp operation.

11. A circuit for operating a discharge lamp comprising:

first and second terminals for connection to a source of pulsatory DC supply voltage for the circuit, DC-AC converter having first and second inputs, means coupling said second input to said second terminal, a first capacitor coupled across the first and second inputs of the DC-AC converter, a first series circuit including a first inductor and a second capacitor coupled across the first and second terminals, a second series circuit of first and second unidirectional elements coupling a junction point between the first inductor and the second capacitor to the first input of the DC-AC converter, a third capacitor connecting a junction point between the first and second unidirectional elements to a circuit point of the DC-AC converter at which a high frequency voltage is present during operation of the lamp, and wherein the resonance frequency of a third series circuit including the first inductor and a parallel circuit of the second capacitor and the third capacitor lies within the range 0.1 Fb and 2.0 Fb, where Fb is the operating frequency of the DC-AC converter.

12. The operating circuit as claimed in claim 11 wherein the DC-AC converter comprises:

first and second controlled switching elements alternately conductive at the operating frequency Fb and connected in a fourth series circuit to said first and second inputs of the DC-AC converter, fourth and fifth capacitors connected in a fifth series circuit to said first and second inputs of the DC-AC converter, and means coupled to a junction point between the first and second controlled switching elements and to a junction point between the fourth and fifth capacitors for supplying a high frequency operating voltage for the discharge lamp.

13. The operating circuit as claimed in claim 12 wherein said circuit point of the DC-AC converter is the junction point between the first and second controlled switching elements.

14. The operating circuit as claimed in claim 11 wherein the ratio between the capacitance of the second capacitor and the capacitance of the third capacitor lies within the range of 1 to 4.

15. The operating circuit as claimed in claim 11 further comprising:

a second inductor connected in the first series circuit, third and fourth unidirectional elements connected in a further series circuit between the second input of the DC-AC converter and a junction point between the second capacitor and the second inductor, and a fourth capacitor connecting a junction point between the third and fourth unidirectional elements to said circuit point.

16. The operating circuit as claimed in claim 15 wherein the DC-AC converter comprises:

first and second controlled switching elements alternately conductive at the operating frequency Fb and connected in a fourth series circuit to said first and second inputs of the DC-AC converter, wherein said circuit point of the DC-AC converter is the junction point between the first and second controlled switching Elements.

17. The operating circuit as claimed in claim 15 wherein a series circuit comprising the second inductor and the parallel circuit of the second capacitor and the fourth capacitor has a resonant frequency which is approximately equal to the converter operating frequency Fb, as is the resonant frequency of the third series circuit.

18. The operating circuit as claimed in claim 15 wherein said coupling means comprises a series circuit including the third and fourth unidirectional elements and the second inductor.

* * * * *